United States Patent Office 3,753,884
Patented Aug. 21, 1973

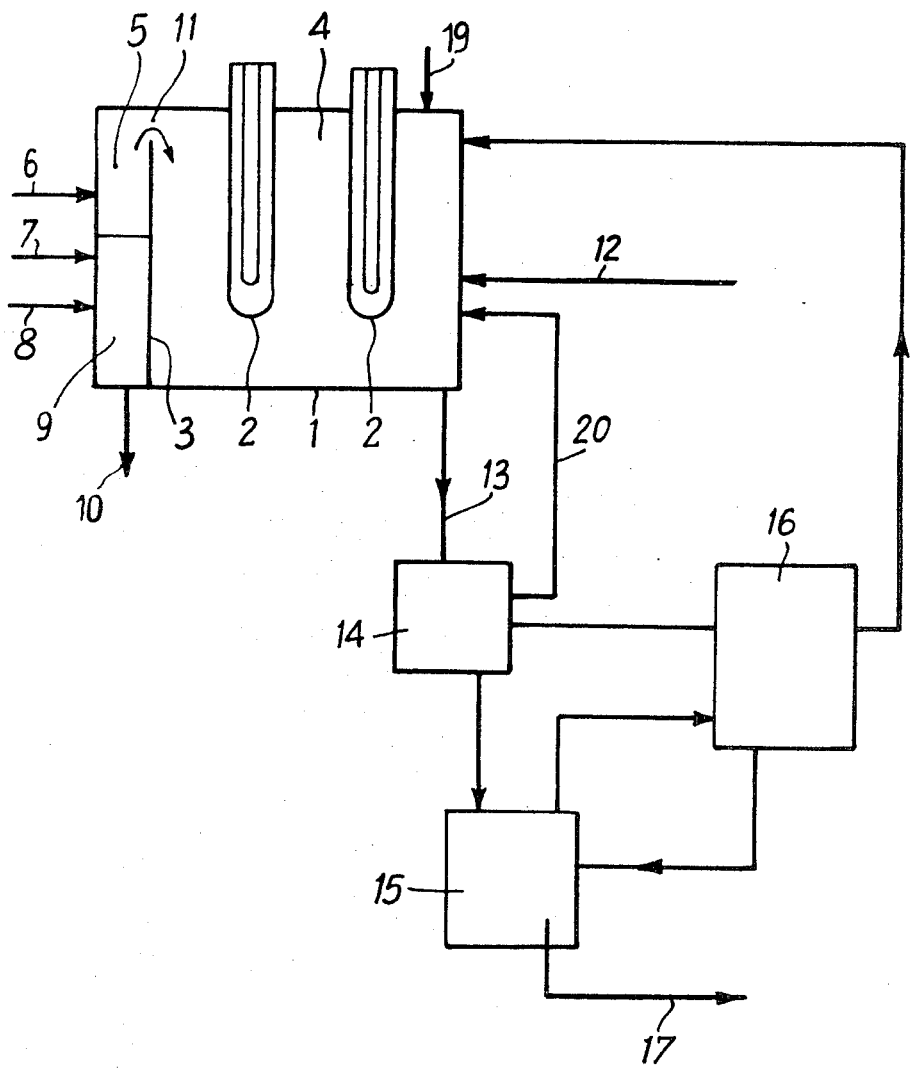

3,753,884
PROCESS FOR THE PHOTOSYNTHESIS OF HYDROCHLORATES OF CYCLOALKANONE OXIMES
Andre Nahmias and Georges Lucas, Paris, Rene Kern, Savigny-sur-Orge, and Claude Poulain, Orsay, France, assignors to Societe Anonyme dite: Aquitaine Total Organico, Paris, France
Filed Apr. 15, 1971, Ser. No. 134,275
Claims priority, application France, Apr. 21, 1970, 7014478
Int. Cl. B01j 1/10
U.S. Cl. 204—162 XN                               7 Claims

ABSTRACT OF THE DISCLOSURE

A photosynthesis process is provided for the preparation of hydrochlorates of cycloalkanone oximes containing more than 5 carbon atoms, by the reaction under irradiation of nitrosyl chloride in a cycloalkane solution in which the nitrosyl chloride is prepared in situ in one section of the reactor, known as the non-oximating zone, separated by a partition with an overflow device from the oximating zone, from a solution of sulphuric nitrosyl acid, dispersed in a mixture of hydrochloric acid and a solvent of cycloalkane. The resulting sulphuric acid is removed from the reactor while the phase containing the nitrosyl chloride extracted by the solvent flows over the overflow device into the oximation zone.

---

The nitrosyl chloride thus prepared is extracted by an organic solvent of cycloalkane and admitted in this organic phase into the oximation zone.

A known method of obtaining, photochemically, cycloalkanone oximes containing more than 5 carbon atoms, and in particular cyclododecanone oxime, is to subject a cycloalkane solution to the action of a nitrosing agent while irradiated by a mercury vapour lamp, in the presence of an excess of hydrochloric acid. Where the solvent is cyclohexane, there results a mixture of cyclohexanone oxime and cyclododecanone oxime, from which the cyclododecanone oxime has to be extracted by a rather complicated process. Whatever solvent is used, tar deposits form on the outside of the radiation source.

In order to remedy this dirtying of the lamps, consideration has been given to using filters and fluorescent substances, so as to eliminate certain radiations with wavelengths that generate by-products, and it has been suggested that there should be continuous or intermittent washing of the surfaces in contact with the reactive mixture by a flow of sulphuric acid.

In any case, such washing results in a loss of output, either through the oxime formed near the lamp being carried away, or because the reaction has to be halted for washing.

Where the solvent is carbon tetrachloride or chlorobenzene, for instance, the oxime that forms can be extracted from the reaction mixture, outside the irradiated zone, by concentrated sulphuric acid.

The dissolving of the oxime in sulphuric acid is a preparatory stage in converting the oxime into lactam in a sulphuric acid mixture; this extraction helps to prevent dirtying of the lamps.

The oxime can also be extracted by means of the sulphuric acid present in the reaction mixture as a result of the reaction of the nitrosylsulphuric acid and hydrochloric acid, or which can be added to the reaction mixture.

One way of keeping the surface of the lamps clean is to perform the reaction with a high proportion of the sulphuric acid phase, allowing the oxime to be extracted and avoiding the formation of tar. However, reactions involving degradation of the oxime in the sulphuric acid phase will result if the concentration of sulphuric acid is too high.

By eliminating the $SO_4^{--}$ ions one can reduce the scale of the secondary reactions which produce, among other things, ketones and nitrous oxide $N_2O$. Furthermore, under certain conditions the presence of sulphuric acid does not guarantee cleanliness of the cooling covers on the lamps unless it is combined with other protective processes, such as coating these covers with waterproof resins, or heating the surface.

Finally, although sulphuric acid is a conversion agent for the Beckmann reaction, and dissolving of the oxime in sulphuric acid is a preparatory stage in transposition, the presence of this acid, greatly diluted and degraded after transposition, is a heavy burden on the profitability of the lactam production process. This residual sulphuric acid, with a high content of degraded organic matter, has to undergo an expensive purification and reconcentration treatment before being recycled. Although sulphuric acid can be used in converting oxime into lactam, its use is in no way necessary in the photo-oximation phase of the operation.

The object of the present invention is to provide a photosynthesis process for the production of hydrochlorates of cycloalkanone oximes containing more than 5 carbon atoms, by the reaction under irradiation of nitrosyl chloride in a cycloalkane solution, in which the nitrosyl chloride is prepared "in situ" in one section of the reactor, known as the non-oximating zone, separated by a partition with an overflow device from the oximating zone, from a solution of sulphuric nitrosyl acid, dispersed in a mixture of hydrochloric acid and a solvent of cycloalkane, the resulting sulphuric acid being separated in the non-oximating zone and drawn off from the reactor, while the phase containing the solvent and nitrosyl chloride that has been formed flows over the overflow device into the photo-oximation zone.

The NOCl resulting from the reaction of hydrochloric acid with a sulphuric solution of nitrosylsulphuric acid, in the non-oximating zone of the reactor, is extracted in the presence of the solvent for the cycloalkane, carbon tetrachloride, for instance. However, the conditions of dispersal of the sulphuric acid phase in the different reagents contained in the non-oximating zone are such that contact between the phases ensures proper decantation of the resulting sulphuric acid. There should be total extraction of the NOCl, without the risk of polluting the sulphuric acid, which is thus recovered in its concentrated state, free from organic impurities. The time needed to extract the NOCl varies depending on temperature, the diameter of the droplets of the reagent parts, and consequently on the hydrodynamic conditions. The time needed for coalescence and decantation of the sulphuric acid also varies depending on the same parameters.

To ensure the best extraction and decantation conditions, the average diameter of the droplets should be between 100 and 800 microns, corresponding to decantation times of one minute to an hour.

The non-oximating section of the reactor can be designed in various ways.

According to one method, applying to a rectangular parallel-piped-shaped or cylindrical reactor with submerged lamps, the irradiated zone may be enclosed by a partition of corrosion-resistant material. The height and position of the partition, rising vertically inside the reactor, allows the NOCl to be extracted and the reagents to pass into the irradiated zone, except for the sulphuric acid, which is decanted and drawn off from the reactor.

According to another method, the non-oximating zone may consist of a pre-reactor placed inside the reactor, in such a position that the extraction of the nitrosyl chloride and the passage over the overflow device of the solvent conveying the nitrosyl chloride to the oximation zone may take place, with exclusion of the sulphuric acid, which is decanted and drawn off from the reactor.

The scope of the invention will be more easily understood from the following examples, given for guidance, but which are not restrictive, and the figures illustrating them.

EXAMPLE 1

FIG. 1 shows a vertical cross-section of a rectangular parallel-piped-shaped reactor in which the non-oximating zone is provided by means of a simple partition, parallel to one wall of the reactor.

Inside the reactor, a vertical partition 3 separates the oximation zone 4, in which is submerged a series of lamps 2, from the non-oximating zone 5; the cycloalkane solvent, carbon tetrachloride, for instance, is fed into the non-oximating zone through 6, the sulphuric acid solution of nitrosylsulphuric acid through 7, and dry hydrochloric acid through 8. $SO_4HNO$ can also be added in a pure state, at a temperature of 73° C., under nitrogen.

The hydrodynamic conditions and temperature in the zone 5 are such that the average diameter of the drops of dispersed components of the mixture fed in is between 100 and 800 microns. Under these conditions the sulphuric acid 9 is rapidly decanted and drawn off at 10, while the nitrosyl chloride which has formed, dispersed in the solvent, and the hydrochloric acid, passes at 11 into the oximation zone, by means of a simple overflow device.

In the oximation zone 4, the cycloalkane is added at 12, since it is better to avoid contact between the cycloalkane and the sulphuric acid, and feed the cycloalkane directly into the oximation zone, where hydrodynamic conditions ensure instant dissolution. The gaseous hydrochloric acid is added at 19, to saturate the reactive mixture.

After a pre-determined period, the reactive mixture, consisting of the hydrochlorate, $CCl_4$, and the non-transformed cyclododecane is removed through 13 to a separator 14. The organic phase $CCl_4$ and cyclododecane is recycled through 20, and the hydrochlorate transferred to 15 for conversion.

The solvent and hydrochloric acid are recovered at 16. The solvent is recycled through 21, and the hydrochloric acid can be re-used for the conversion at 15. The lactam is recovered at 17.

EXAMPLE 2

In a photosynthesis installation like that described in Example 1, consisting of a 10-litre reactor partitioned to form a 7-litre oximation zone and a 3-litre non-oximating zone, 2 high-pressure 200-watt mercury vapour lamps are submerged in the oximating zone.

300 gr. of carbon tetrachloride, 70 gr./hr. of a sulphuric acid solution of 73% nitrosylsulphuric acid, and 20 gr./hr. of dry hydrochloric acid are fed into the non-oximating zone 5. At the same time, 800 gr. of cyclododecane and 3.8 litres of carbon tetrachloride are fed into the oximating zone 4, kept at 15° C., and it is saturated with anhydrous hydrochloric acid; dispersal is also ensured by stirring.

The sulphuric acid is decanted continuously, and collected at 10; after 5 hours' oximation, 290 gr. of pure sulphuric acid are obtained, namely 58 gr./hr.

The quantity of oxime, calculated on the basis of the hydrochlorate obtained, is 280 gr. in 5 hours, in other words an output corresponding to 84% of the original cyclododecane.

EXAMPLE 3

Where the reactor is cylindrical, the non-oximating zone forms a ring-shaped space round the oximating zone in which the lamps are submerged.

According to the different embodiments of the invention already described, this non-oximating zone may be formed by positioning a double cylindrical wall, concentric with the reactor, or by a pre-reactor consisting of two coaxial cylindrical surfaces joined by a crown-shaped base, the height of these surfaces being such that extraction of the NOCl and the passage over the overflow device of the NOCl, solvent and hydrochloric acid will take from one minute to an hour, simultaneously with the decantation and extraction of the sulphuric acid.

What we claim is:

1. In a photosynthetic process for the production of hydrochlorates of cycloalkanone oximes by irradiating a mixture of nitrosyl chloride, a cycloalkane and hydrochloric acid, the improvement comprising
    (a) Feeding continuously into a first zone adjacent to and separated from an irradiation zone by a partition, a nitroso sulphuric acid solution of sulphuric nitrosyl acid, a solvent for the cycloalkane and hydrochloric acid, to obtain nitrosyl chloride and hydrogen chloride, as an upper phase, and sulphuric acid as a lower phase;
    (b) Passing said upper phase as an overflow into said irradiation zone;
    (c) Feeding continuously and separately a cycloalkane and a solvent therefor into said irradiation zone;
    (d) Irradiating the resulting mixture obtained in (c);
    (e) Continuously and substantially simultaneously withdrawing said lower phase containing sulphuric acid from said first zone and withdrawing the resulting separated irradiated reaction mixture and separating the hydrochlorate of cycloalkane thus formed.

2. A process according to claim 1 wherein the cycloalkanone oxime contains more than 5 carbon atoms.

3. A process according to claim 1 wherein the hydrochloric acid is gaseous hydrochloric acid.

4. A process according to claim 3 wherein sufficient gaseous hydrochloric acid is added to saturate the reaction mixture.

5. A process according to claim 1 wherein the solvent is a member of the group consisting of carbontetrachloride, cyclohexane, and chlorobenzene.

6. A process according to claim 1 wherein the average diameter size of the droplets of the components of the reaction mixture varies between about 100 and 800 microns and the separation and extraction time varies between about 1 and 60 minutes.

7. A process according to claim 1 wherein the recovered sulphuric acid is concentrated and re-used in the preparation of the nitroso sulphuric acid solution.

References Cited
UNITED STATES PATENTS

| | | | |
|---|---|---|---|
| 3,177,133 | 4/1965 | Metzger et al. | 204—162 XN |
| 3,553,091 | 1/1971 | Nishikawa et al. | 204—162 XN |
| 3,320,143 | 5/1967 | Baumgartner et al. | 204—162 XN |
| 2,818,380 | 12/1957 | Welz | 204—162 XN |

FOREIGN PATENTS

| | | | |
|---|---|---|---|
| 10,145 | 4/1968 | Japan | 204—162 XN |

BENJAMIN R. PADGETT, Primary Examiner

U.S. Cl. X.R.

204—158 R